United States Patent [19]

Maas

[11] Patent Number: 4,750,582
[45] Date of Patent: Jun. 14, 1988

[54] TRACTION SLIP CONTROL DEVICE

[75] Inventor: Joachin Maas, Darmstadt, Fed. Rep. of Germany

[73] Assignee: Alfred Teves GmbH, Frankfurt Am Main, Fed. Rep. of Germany

[21] Appl. No.: 64,871

[22] Filed: Jun. 19, 1987

[30] Foreign Application Priority Data

Jul. 28, 1986 [DE] Fed. Rep. of Germany ....... 3625471

[51] Int. Cl.$^4$ ............................................. B60K 31/00
[52] U.S. Cl. ..................................... 180/197; 123/396
[58] Field of Search ...................... 180/197, 175, 177; 123/378, 396, 401

[56] References Cited

U.S. PATENT DOCUMENTS

| | | | |
|---|---|---|---|
| 3,776,355 | 12/1973 | Scherenberg | 180/197 |
| 3,844,371 | 10/1974 | Garcea | 180/197 |
| 4,545,455 | 10/1985 | Kanemura et al. | 180/197 |
| 4,703,823 | 11/1987 | Yogo et al. | 180/197 |

FOREIGN PATENT DOCUMENTS

| | | | |
|---|---|---|---|
| 320500 | 3/1957 | Switzerland | 123/396 |
| 1370338 | 10/1974 | United Kingdom . | |

*Primary Examiner*—John A. Pekar
*Attorney, Agent, or Firm*—James B. Raden; Robert P. Seitter

[57] ABSTRACT

A traction slip control device is disclosed including a sensor which senses a beginning slip action at at least one of the driving wheels. Connected to the sensor is a control circuit which, via an auxiliary drive, actuates the throttle valve of the drive motor in a closing manner when the sensor feeds a slip signal to the control circuit. The auxiliary drive is an articulated hydraulic control element. Its piston rod forms the push rod of a crank mechanism whose crank member is connected by means of a transmission cable with the throttle valve linkage. The accelerator pedal acts via a second transmission cable upon sector disk which is connected with the crank member via a spring. As the traction slip control device reacts, the hydraulic control element turns the crank member in order to close the throttle valve. In this process, the spring is stretched, and the crank member follows according to the position of the sector disk. The crank mechanism imitates the relationship of the delivered engine torque to the throttle valve angle.

20 Claims, 4 Drawing Sheets

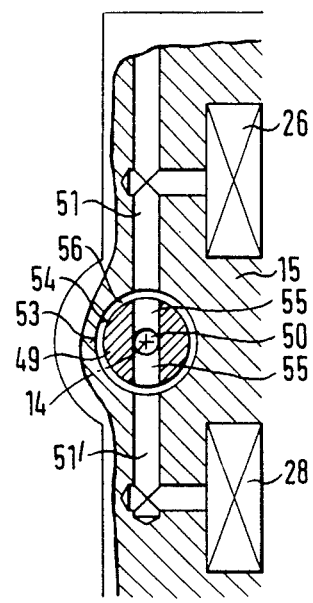
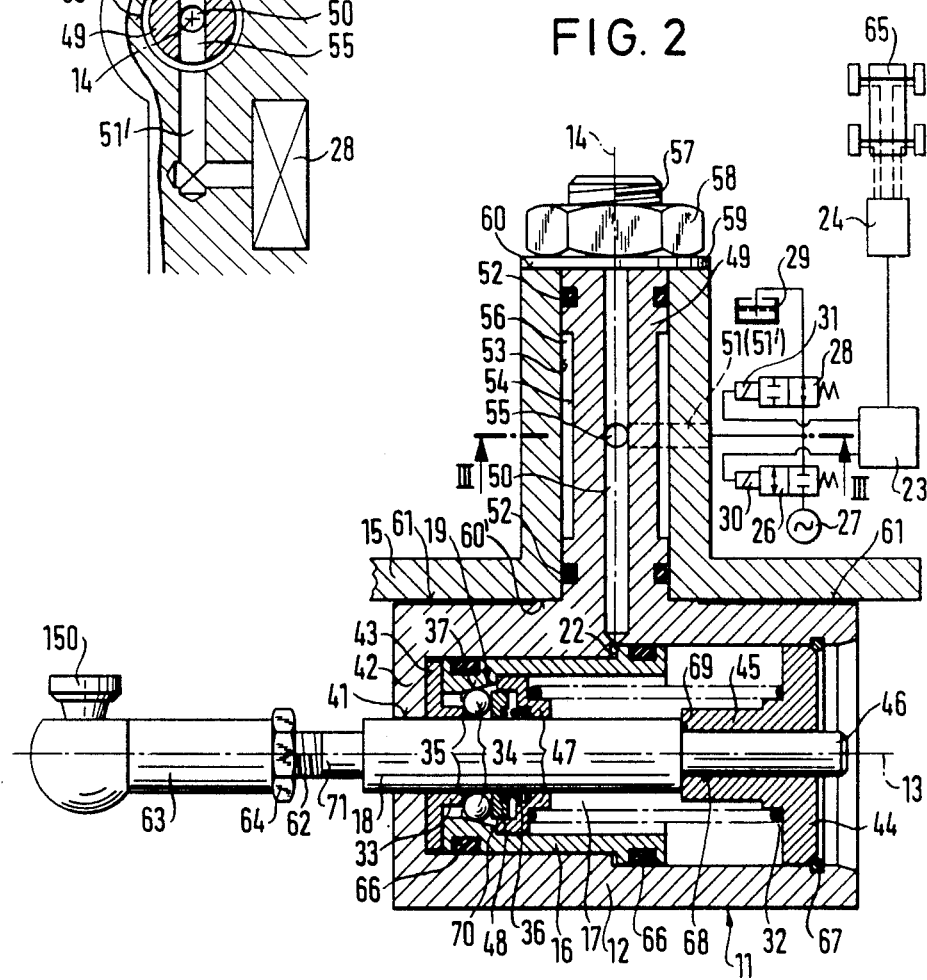

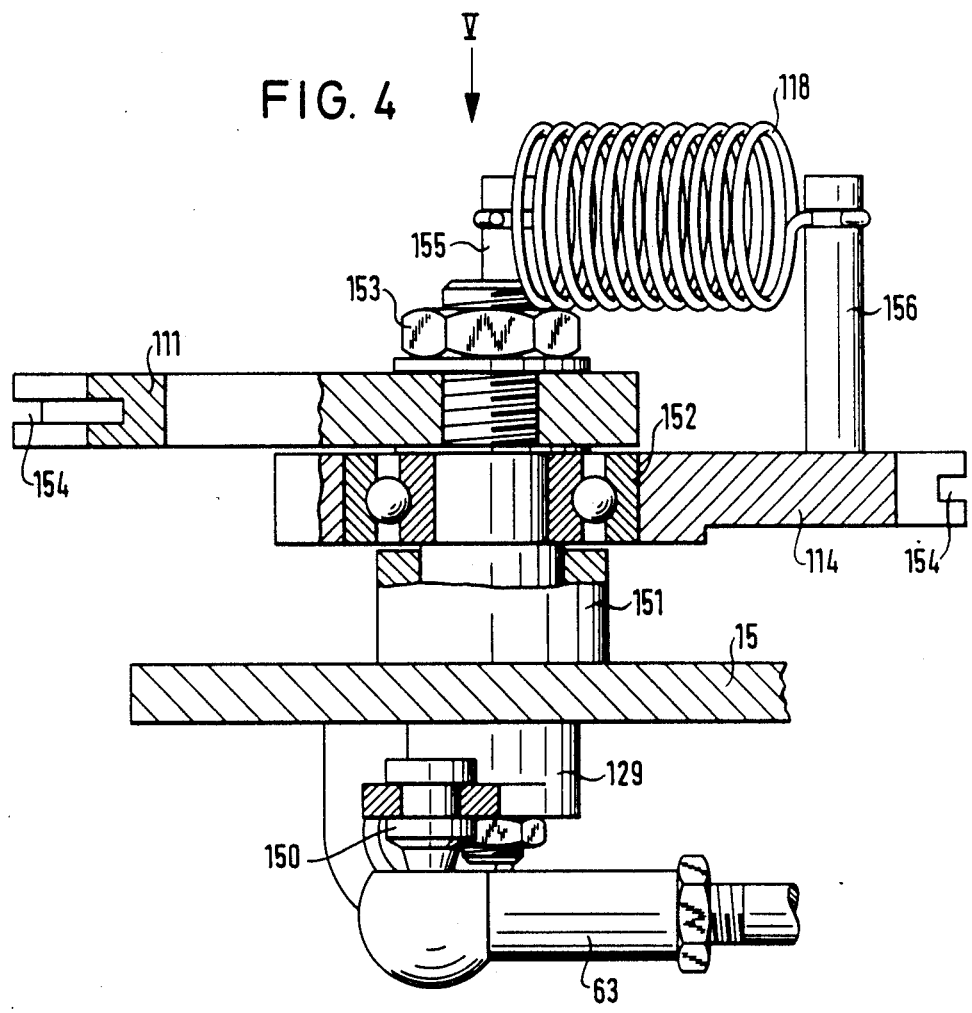

TRACTION SLIP CONTROL DEVICE

BACKGROUND OF THE INVENTION

The present invention relates to a traction slip control device including a sensor which senses a beginning slip action at at least one of the driving wheels and connected to the sensor is a control circuit which by way of an auxiliary drive actuates the throttle valve of the drive engine in a closing manner when the sensor ends a slip signal to the control circuit.

For control of the traction slip of motor vehicles, an interference with the setting of the throttle valve is necessary. Up to now, electric motors were used for this purpose.

SUMMARY OF THE INVENTION

The objective of the present invention is to use a pressure-fluid operated, in particular hydraulic, control element instead of electric motors, while avoiding, however, the constant circulation of the hydraulic fluid.

This object is achieved according to the present invention which provides that the auxiliary drive is a pressure fluid operated working cylinder which actuates the push rod of a crank mechanism, of which the crank member which is hinged to the push rod is connected with the throttle valve and by way of a spring element with an accelerator-pedal-actuated member, while the working cylinder overcomes the force of a spring element.

The pressure fluid operated working cylinder according to the invention is inexpensive and easy to integrate in the pressure fluid circuit, in particular the hydraulic circuit, of a vehicle. In regard to the influencing of the throttle valve setting by the working cylinder whose cylinder liner and piston rod effect a linear lifting movement relative to each other, it must be taken into consideration, however, that there is a non-linear relationship between the setting angle of the throttle valve and the torque delivery of the vehicle motor. The crank mechanism is of simple construction and is inserted according to the invention between working cylinder and throttle valve and allows the stroke of the working cylinder to be converted into a substantially proportional change of the torque of the vehicle motor. The accelerator-pedal-actuated member serves the purpose of driving the throttle valve in accordance with the accelerator pedal position while the traction slip control device is in operation.

In a preferred embodiment, the crank arm and the push rod of the crank mechanism form a large angle, preferably close to 90 degrees, when the throttle valve is in its closing position associated with the idle speed of the motor, and in opening position of the throttle valve associated with a full speed condition the crank mechanism comes close to a dead center position and forms an angle of less than 30 degrees, and in particular 10 to 20 degrees and preferably about 15 degrees. A preset linear stroke of the working cylinder triggered by a pressure impulse of the hydraulic working medium is thus transmitted for control from the full-speed position into a greater angle setting stroke of the throttle valve than in case of a control in an intermediate-speed position close to idle. This corresponds to the fact that at full speed the throttle valve must move considerably to reach an appreciable decrease of the motor torque, whereas close to idle the torque delivery by the motor reacts sensitively to even minor adjustments of the throttle valve angle.

The crank member can be a first sector disk over which a transmission cable runs up to the throttle valve linkage. A second sector disk arranged on the same axle as the first sector disk and rotatable relative thereto can be provided, which is operated by a second transmission cable running up to the accelerator pedal. A tension spring extending substantially transverse to a contact radius of the sector disks can be provided as a spring element. The tension spring has the advantageous effect that when the two sector disks drive apart, as is the case when the traction slip control device starts operating, the driving spring force acting on the throttle valve does not increase appreciably since the application of the spring force shifts radially inward. Accordingly, the working cylinder which must overcome the driving spring force can be designed weaker, and the influence of the spring element on the control behavior is low.

The working cylinder can be arranged swivellingly on the axle parallel to the crank axle, and its piston rod can form the push rod or an axial extension of the push rod. This arrangement provides for a particularly simple construction.

The piston rod can be connected by way of an axial locking mechanism with the piston of the working cylinder. Thus is becomes possible to override the just operating traction slip control device, when the driver releases the accelerator pedal. The axial locking mechanism releases the piston rod providing for a linear movement in the closing direction of the throttle valve thus overriding the piston.

The traction slip control device is preferably activated by fixedly applying the piston to the piston rod by pressure fluid operation. Thus it is possible by pressurization to exert a displacement force acting on the piston rod in the closing direction of the throttle valve. However, the axial locking mechanism should release the piston rod from the piston for a displacement force acting from outside in the closing direction of the throttle valve overriding the piston, such as when the accelerator pedal is released.

The invention provides for a working cylinder of simple operation with a spring-return mechanism. The fixed application of the piston to the piston rod and the displacement force acting in the closing direction of the throttle valve can be accomplished in a constructively inexpensive manner by pressurization of one single working chamber of the working cylinder.

The working cylinder according to the invention, includes a stepped cylinder with a stepped piston which can be slidingly displaced therein, which stepped piston, in an axial bore, accommodates the piston rod and also encloses the axial locking mechanism. Thus there is provided a very compact construction.

According to an advantageous feature, an annular pressure chamber is arranged between the stepped piston and the stepped cylinder and is connected by way of an opening valve to a pressure source and by way of a closing valve to a supply reservoir. The opening valve and the closing valve are actuated by electromagnets which are connected to and controlled by the control circuit. Such an arrangement is particularly suitable for phased control of the working cylinder with displacement of the piston rod in small steps.

According to another advantageous feature, the axial locking mechanism includes a sleeve slidingly arranged in the axial bore of the stepped piston, but fixed to the stepped cylinder, and having a cone-type taper provided at a front side facing balls arranged around the piston rod. The balls are pressed in the rest position of the stepped piston against the taper by an auxiliary spring supported on the stepped piston, while being brought to rest, as they move away from the piston rod, against a cone-type enlargement at the circumference of the axial bore.

According to a further important feature, the piston rod emerges through a bore in an associated front wall at the front side of the hydraulic control element which is located at the side of the free end of the smaller diameter portion of the stepped piston, the crank member which is connected with the throttle valve is connected at that end.

Safe support and holding of the sleeve is assured by providing for the sleeve to include, at the side facing the front wall, a ring flange that abuts against the front wall.

In order to prevent the penetration of dirt into the inside of the hydraulic control element, a further feature provides that, at the front side of the hydraulic control element facing away from the side where the piston rod emerges, a protective cap is axially fixedly inserted in the stepped clylinder, at which the readjusting spring is supported. The arrangement of the protective cap preferrably is such that the interior of the stepped cylinder is not tightly sealed so that, during the axial movements occurring in operation of the stepped piston, a pressure compensation is possible past the protective cap. The same applies analogously to the arrangement of the sleeve and the passing of the piston rod through the opposite front wall of the stepped cylinder.

For unobjectionable and particularly stable guidance of the piston rod it is further provided that the protective cap include a guide sleeve extending axially into the inside of the stepped cylinder and in the guide sleeve a guiding extension of the piston rod is slidingly guided.

For simultaneous support of the auxiliary spring and readjustment of the stepped piston is advantageous, if a spring support in the form of an annular cap is provided in the area of the abutment of the readjustment spring at the stepped piston. The spring support slidingly surrounds the piston rod with a guide portion surrounded by the end of the readjusting spring and is supported by a portion projecting first radially outward and then axially at the stepped piston close to and radially outward of the enlargement. The auxiliary spring is supported on the one side at the spring support and on the opposite side at a supporting ring which is axially slidingly guided on the piston rod.

According to the invention, there is provided a combined swing-guide pivot which includes an axial bore arranged on the transverse axis of the control element which bore is closed at the one side and opens into a pressure chamber at the other side. The axial bore is connected by a branching hydraulic conduit to an opening valve and to a closing valve.

Advantageously, the swing guide pivot is swingingly and sealedly supported at both ends with gaskets in a guide bore running concentrically with the transverse axis. The swing-guide includes a small-diameter portion where at one or more branch channels extend from the axial bore to the surface of the swing-guide pivot. In the portion of the main body accommodating the guide bore hydraulic conduits are provided which are connected to the opening valve or the closing valve, respectively, and open into the annular cylinder chamber formed by the small-diameter portion.

A further advantageous feature provides one hydraulic conduit branches off at diametrically opposed sides from the annular cylinder chamber, each such conduit leading to an associated opening valve or closing valve.

In order to fix the hydraulic control element, the swing-guide pivot emerges from the main body at the side thereof facing away from the hydraulic control element and at that end is provided with an external thread. A nut is screwed onto the external thread with the nut pushing a washer against the front wall of the main body, from which the end-portion of the swing-guide pivot provided with the external thread emerges.

Furthermore, it is important for unobjectionable pivoting guidance of the hydraulic control element that, according to a further embodiment, the stepped cylinder comprises, around the swing-guide pivot, an annular bearing surface which slightly projects axially from the surface of the stepped cylinder in the direction of the pivot and is in sliding contact with a supporting adjacent to the stepped cylinder.

In order to allow the basic setting between the piston rod and the actuating linkage of the throttle valve to be adjusted, a further development of the present invention provides that the piston rod comprises an end piece provided with an external thread which is screwed into a corresponding internal thread of an adjoining joint sleeve to a desired depth, the fixing of the basic setting thus found being effected by means of a counternut.

BRIEF DESCRIPTION OF THE DRAWINGS

The invention is described hereinafter with reference to the accompanying drawings, wherein:

FIG. 2 is a partial cross-sectional top view of the working cylinder of the traction slip control device according to FIG. 1, and a block diagram of the circuit arrangement, FIG. 3 is a cross-sectional view taken along the line III—III in FIG. 2, FIG. 4 is a partial cross-sectional top view of a crank mechanism of the traction slip control device.

DETAILED DESCRIPTION OF THE PREFERRED EMBODIMENT

Figure 1:
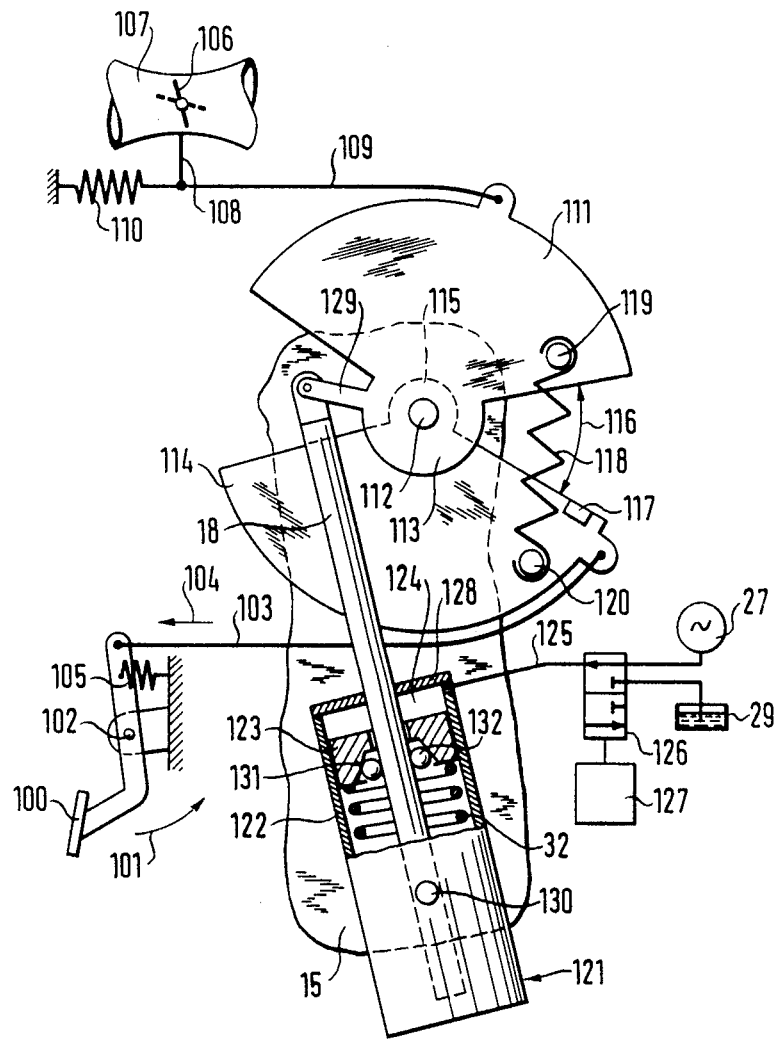
FIG. 1 is a diagrammatic view of a traction slip control device in accordance with the present invention.

FIG. 1 shows a diagrammatic view of an accelerator pedal 100 of a motor vehicle. To accelerate the vehicle, the accelerator pedal 100 is pushed in the direction 101, while pivoting around an axle 102. Connected to the accelerator pedal 100 is a transmission cable 103 which upon actuation of the accelerator pedal 100 is pulled in the direction 104. The accelerator pedal 100 is subject to the force of a readjusting spring 105.

The accelerator pedal 100 influences the setting of a throttle valve 106 which is accommodated in the intake tube 107 of an internal-combustion engine serving to drive the vehicle. The throttle valve 106 is connected with a conventional throttle valve linkage 108 which in turn is connected with a second transmission cable rope 109. Opposing the force of the cable is a closing spring 110 which prestresses the throttle valve 106 in a closing direction corresponding to an idle speed of the engine. The throttle valve 106 can be opened more or less wide by cable actuation against the force of the closing spring 110, the fully opened position of the throttle valve 106 corresponding to a full-speed driving operation.

The cable connected with the throttle valve linkage 108 is fastened at the periphery of a first sector disk 111 which is swingingly arranged around a center axle 112 at a main body 15. The sector disk 111 comprises a guide portion 113 by which it is arranged on the axle 112. It forms a sector whose radius and peripheral angle have been selected to correspond to the required regulating stroke of the throttle valve 106.

A second sector disk 114 is also arranged centrally on the same axle 112. The associated guide portion is indicated at 115. To the periphery of the second sector disk 114, the cable 103 leading to the accelerator pedal is applied so that the sector disk 114 is displaced upon actuation of the accelerator pedal.

The radius and peripheral angle of the sector disks 111, 114 correspond to each other in the illustrated example of an embodiment. In normal driving operation, the sector disks 111, 114 are in contact with each other along a common contact radius 116. This position is defined by a stop 117 which is carried by the second sector disk 114 at the level of the contact radius 116. The sector disks are prestressed in the contact position by means of a spring element 118. The spring element 118 in the illustrated embodiment is a tension spring which is fastened to the first sector disk 111 at 119 about midway of the contact radius 116 in its immediate vicinity. The fastening point 120 for the other end of the spring 118 at the second sector disk is arranged further toward the disk's periphery in such a way that the spring 118 in contact position of the sector disks 111, 114 extends substantially transverse to the contact radius.

In normal driving operation, the contact position of the two sector disks 111, 114 is permanently maintained. As the accelerator pedal 100 is pressed down, the second sector disk 114 is displaced by cable operation. The first sector disk 111 coupled to it by means of the spring 118 follows this movement immediately and the throttle valve 106 is regulated by way of the cable rope 109 and the throttle valve linkage 108. The throttle valve angle thus follows the position of the accelerator pedal in a conventional manner. In normal driving operation, the sector disks 111, 114 do not move apart, not even when the accelerator pedal 100 is released. In this case, no pulling force is exerted any more by the accelerator pedal 100, whereupon the closing spring 110 closes the throttle valve and moves the sector disks 111, 114 back to their starting position. At the same time, the accelerator pedal 100 is readjusted by means of the readjusting spring 105. In view of all this, it is understood that the closing spring 110 for the throttle valve 106 is weaker than the spring 118 by which the sector disks 111, 114 are forced together.

The sector disks 111, 114 only move apart to the position shown in FIG. 1, when the traction slip control device as proposed by the present invention is active. This is the case when a slip action occurs at the driving wheels of the vehicle, the details of the triggering control not being of interest in this connection. In case of a slip action at the driving wheels, an auxiliary drive with a pressure-actuated working cylinder 121 acts upon the first sector disk 111 and the throttle valve 106 associated with it.

The working cylinder 121 comprises a cylinder liner 122 wherein a piston 123 is axially slidingly guided. The piston 123 separates a working chamber 124 within the working cylinder, with a pressure fluid connecting port leading to the working chamber. The connecting port is connected with a conduit 125 by way of which the working chamber 124 can be pressurized or depressurized, as required. The working cylinder is preferably hydraulically operated. The pressure source is a pump 27 and the pressure relief is a reservoir 29, both of which can be connected alternatively by a valve arrangement 126 with the conduit 125. A control unit 127 enables a rapid change of stroke.

The working cylinder 121 is of simple operation. On the side facing away from the working chamber 124, the piston 123 is subject to the force of a readjusting spring 32. The piston 123 is an annular piston with a central axial opening through which a piston rod 18 extends with play. The piston rod 18 emerges from the cylinder liner 122 on one side through a cylinder head 128.

The piston rod 18 or an extension thereof engages with the first sector disk 111 which is connected with the throttle valve by a cable rope. The sector disk 111 forms the crank member of a crank mechanism whose push rod is the piston rod 18. A crank arm 129 extends from the portion 113 and is eccentrically engaged. The working cylinder as a whole is arranged swivellingly on an axle 130 at the main body 15. The axle 130 extends parallel to the axle 112 of the sector disks 111, 114. When the drive motor is idling and the throttle valve 106 is closed, the piston rod 18 is inserted to its maximum within the cylinder liner 122. At that point it forms the widest angle with the crank arm 129, preferably close to 90 degrees. At full speed in normal driving operation, however, the piston rod 18 is at the end of its outward stroke. The crank mechanism has then come close to a dead center, and accordingly the angle between the piston rod 18 and the crank arm 129 is small; it may be for example less than 30 degrees, in particular 10 to 20 degrees, and preferably approximately 15 degrees.

When the working chamber 124 is depressurized, the piston rod 18 is released from the piston 123, it then has axial play. If the working chamber 124 is pressurized, however, the piston 123 and the piston rod 18 are locked relative to each other in an axial direction. For this purpose the inner ring of the piston 123 comprises a tapered surface 131 which cooperates with a plurality of balls 132 that are applied to the piston rod 18. The taper is designed such that when the working chamber 124 is pressurized the balls 132 are pressed after a very short stroke against the piston rod 18 which is thus carried along and inserted in the cylinder liner 122.

The coupling between the piston 123 and the piston rod 18 is designed such that it simultaneously fulfills the function of a unidirectional axial free-wheel for the piston rod. It is always possible by the action of an external force to insert the piston rod 18 into the cylinder liner 122 faster than the piston 123 moves in that direction, since the locking action of the balls 132 is released.

In normal driving operation, the working chamber 124 is unpressurized and has its smallest volume. The piston 123 is readjusted by the readjusting spring 32 to an initial position in which it is in contact with the cylinder head 128 through which the piston rod 18 emerges. Since the working chamber 124 is not pressurized, the piston rod 18 is released from the piston 123 and thus has play to move axially in both directions. As already described, actuation of the accelerator pedal 100 causes the second sector disk 114 to pivot. The first sector disk 111 coupled thereto by the spring 118 follows that movement immediately and the throttle valve 106 is adjusted, while the piston rod 18 is simply carried along. It is drawn out of or inserted into the cylinder liner 122 by the actuating force of the accelerator pedal 100 and/or the readjusting force of the throttle valve closing spring 110. At the same time, the working cylinder 121 as a whole pivots around its axle 130.

If an undesired slip now occurs in whatever position of the accelerator pedal at the driving wheels of the vehicle, a corresponding signal is fed to the control unit 127. The control unit reacts and the working chamber 124 of the working cylinder 121 is pressurized by pressure fluid. This causes the piston 123 to be fixedly applied to the piston rod 18 and the piston rod to be carried along in an inserting movement into the cylinder liner 122. Thus the first sector disk 111 is pivoted by means of the crank mechanism so that the throttle valve 106 closes by a certain angle.

By this pivoting movement the first and the second sector disks 111, 114 move apart and the spring 118 arrangement between them is stressed. The closing of the throttle valve occurs irrespective of whether the driver maintains the position of the accelerator pedal or tries to accelerate by pressing the pedal down; the latter only causes the sector disks 111, 1145 to move further apart. The working cylinder 121 is strong enough to pivot the first sector disk 111 against the force of the spring element 118 and to hold it in any position. The described arrangement of the spring element offers the particular advantage that, as the sector disks 111, 114 move apart, the lever arm of the spring shifts radially inward toward the axle. Thus the displacement force of the spring element 118 does not increase excessively, even when the angle between the sector disks 111, 114 is large. Its influence on the regulating behavior is low, and a comparatively inexpensive design of the working cylinder 121 is possible.

As the throttle valve 106 automatically closes, the torque delivered by the internal-combustion engine decreases. After a sufficient stroke of the piston rod, no slip action thus occurs any more at the driving wheels of the vehicle, which is detected in an appropriate manner and signalled to the control unit. Whereupon the latter reverses the valve arrangement 126, which in turn causes the working chamber 124 to be depressurized. Then the piston 123 is readjusted by the readjusting spring 32. Simultaneously, the spring element 118 tries to pivot the first sector disk 111 unit it is in contact with the second sector disk 114 again, whereby the piston rod 18 is drawn out of the cylinder liner 122 and the throttle valve 106 is opened. In the event of a new slip action occurring in that process at the driving wheels of the vehicle, the valve arrangement 126 reverses the movement of the piston rod 18, etc. In fact, the control behavior of the valve arrangement 126 is dynamic. The changing over between pressurization and depressurization of the working chamber 124 is accomplished in rapid phases, whereby the vehicle drive is kept close to the slip point and optimum acceleration is achieved.

The driver can override the effective slip control device by releasing the accelerator pedal 100. In the case, the force of reaction for the spring element 118 is lacking and the closing spring 110 can close the throttle valve 106. The working cylinder 121 in no case offers any resistance, since the axial locking mechanism acting between the piston 123 and the piston rod 18 is designed as free-wheel in the direction of insertion of the piston rod.

There is a non-linear relationship between the throttle valve angle and the torque delivered by the internal-combustion engine. To change the torque delivered by the engine by a specific amount, only a minor change of the throttle valve angle is required near idle speed where the throttle valve is almost closed, but a major change of the throttle valve angle is required near full speed and with a wide open throttle valve. This relationship is imitated by the crank mechanism proposed by the present invention. The effect of the dynamic control of the working cylinder 121 is that its working chamber 124 receives short pressure pulses. They are converted into short linear strokes of the piston rod 18, which near the dead center of the crank mechanism (full speed position), cause relatively great changes of the throttle valve angle, but near the 90 degree point of the crank mechanism (idle position) only minor changes of the throttle valve angle. Thus, over the entire control range, torque steps of substantially equal size correspond to the strokes of the piston rod 18, as is desirable for optimal control behavior.

Further details of the traction slip control device in accordance with the present invention can be appreciated from the following description of the embodiment illustrated in FIGS. 2 to 5.

According to FIG. 2, the four driving wheels of an automotive vehicle shown in diagrammatic view feed rotating speed signals to a sensor 24, which converts them into a signal indicating a beginning slip action of the driving wheels and feeds the signal to a control circuit 23. The control circuit 23 pressurizes an opening valve 26 arranged between a pressure source 27 and the hydraulic control element 11 proposed by the invention by means of an electromagnet 30 and a closing valve 28 also arranged between the hydraulic control element 11 and a supply reservoir 29 by means of an electromagnet 31.

The hydraulic conduits 51, 51'coming from the opening valve 26 and the closing valve 28, as can be seen in particular in FIG. 3, lead to an annular cylinder chamber 56 provided in the main body 15 or a portion connected therewith. The annular cylinder chamber is provided between a guide bore 53 and a lower-diameter portion 54 of a combined swing-guide pivot 49. According to FIG. 3, diametrically opposed branch channels 55 are provided in the swing-guide pivot 49 at the level of the hydraulic conduits 51, 51'. The branch channels 55 run radially from the surface of the lower-diameter portion 54 to an axial bore 50, which runs concentrically with the transverse axis 14 of the swing-guide pivot 49 inside the pivot.

At one end, the swing-guide pivot 49 axially emerges from the main body 15 or the portion connected therewith and there it has a lower diameter and is provided with an external thread 57 onto which a nut 58 is screwed, which in turn presses a washer 59 against an even annular bearing surface 60 of the main body 15.

Axially outside the annular cylinder chamber, gaskets 52 are accommodated in peripheral grooves of the swing-guide pivot 49 slidingly arranged in the guide bore 53. The gaskets axially seal the annular cylinder chamber 56.

On the front side facing away from the fastening nut 58, the swing-guide pivot 49 passes into the stepped cylinder 12 of the hydraulic control element 11, with the longitudinal axis 13 of the stepped cylinder 12 being perpendicular to the transverse axis 14 of the swing-guide pivot 49.

At the point where the swing-guide pivot 49 branches off from the stepped cylinder 12, the outside of which may be cylindrical or of cuboid form, an even annular bearing surface 60' is provided around the base of the swing-guide pivot 49, which bearing surface is in sliding contact with an even supporting surface 61 facing it at the main body 15 or a portion fixedly connected therewith.

Thus the hydraulic control element 11 can pivot around the transverse axis 14 in both directions. In order to prevent the nut 58 from loosening as the control element 11 pivots. It should be secured, for example, by an counternut in a manner not illustrated.

Within the hydraulic stepped cylinder 12, a stepped piston 16 of complementary dimensions is axially slidingly arranged and sealed by gaskets 66 opposite the stepped cylinder 12. Thus, the hydraulic fluid entering through the axial bore 50 into the adjoining pressure chamber 22 between the stepped cylinder 12 and the stepped piston 16 is prevented from penetrating outside between the stepped piston 16 and the stepped cylinder 12.

At the righthand front side, as shown in FIG. 2, the stepped cylinder 12 is closed, but not pressure-sealedly by a protective cap 44 which is axially fixed at the periphery by means of a retaining ring 67 at the inner periphery of the stepped cylinder 12.

From the protective cap 44, a guide sleeve 45 projects into the inside of the stepped cylinder 12, the internal bore 68 of the guide sleeve also extends through the protective cap 44. In the internal bore 68, a guiding extension 46 is slidingly arranged which is coaxially connected with a piston rod 18 of somewhat larger diameter which extends through the axial bore 17 of the stepped piston 16 to the opposite front wall 42 of the stepped cylinder 12, where it is led outside through a central bore 41 in the front wall 42.

FIG. 2 shows the position of the piston rod 18 corresponding to idle, in which position the annular step 69 provided between the guiding extension 46 and the piston rod 18 abuts against the front wall of the guiding sleeve 45 that faces away from the protective cap 44.

Inside the axial bore 17 of the stepped piston 16 there is an axial locking mechanism 19 which cooperates with the peripheral surface of the piston rod 18.

Through the axial bore 17 of the stepped piston 16 a sleeve 33 extends from the front wall 42. The sleeve 33 forms a single unit with a ring flange 43 which rests against the front wall 42 from inside and has an outer diameter corresponding to the inner diameter of the stepped cylinder 12 at that point.

At the side facing away from the front wall 42, the sleeve 33 slidingly arranged around the piston rod 18 comprises a taper 35 tapered towards the open end of the stepped cylinder 12, next to which taper 35 a number of balls 34 are arranged around the piston rod 18. The balls are in contact with each other in circumferentially. Radially outward of the balls 34, the inner wall of the stepped piston 16 is provided with an enlargement 37 which preferably enlarges conically from the front wall 42 in the direction of the open end of the stepped cylinder 12.

The balls 34 are pressed against the taper 35 by means of a supporting ring 48 which is provided opposite the taper 35 and is axially pressurized by an auxiliary spring 36, the balls run radially slightly outward along the taper 35 and get into radial contact with the enlargement 37, at a point which is radially somewhat further outward, from where the balls 34 can still slide slightly inward due to axial displacement as shown in FIG. 2 until they get into clamping contact with the piston rod 18.

At its end facing away from the supporting ring 48, the auxiliary spring 36 is supported by spring 47 in the form of an annular cap surrounding the piston rod 18. The spring support 47 is axially supported—with a portion extending radially outward and axially, around the supporting ring 48—on an inner step 70 of the stepped piston 16 and is pressurized by a readjusting spring 32 in the direction of the inner step 70, which in turn is supported with its other end at the protective cap 44.

At its end emerging from the front wall 42, the piston rod 18 comprises an end portion 71 with an external thread 62, onto which the matching internal thread of a joint sleeve 63 is screwed to a desired depth. A counternut 64 also screwed onto the external thread 62 ensures the fixing of the set relative position between the piston rod 18 and the joint sleeve 63. Next to the joint sleeve 63, in continuation of the piston rod 18, there follows a joint head 150 by way of which the crank member of the crank mechanism proposed by the invention is connected.

Figure 5:
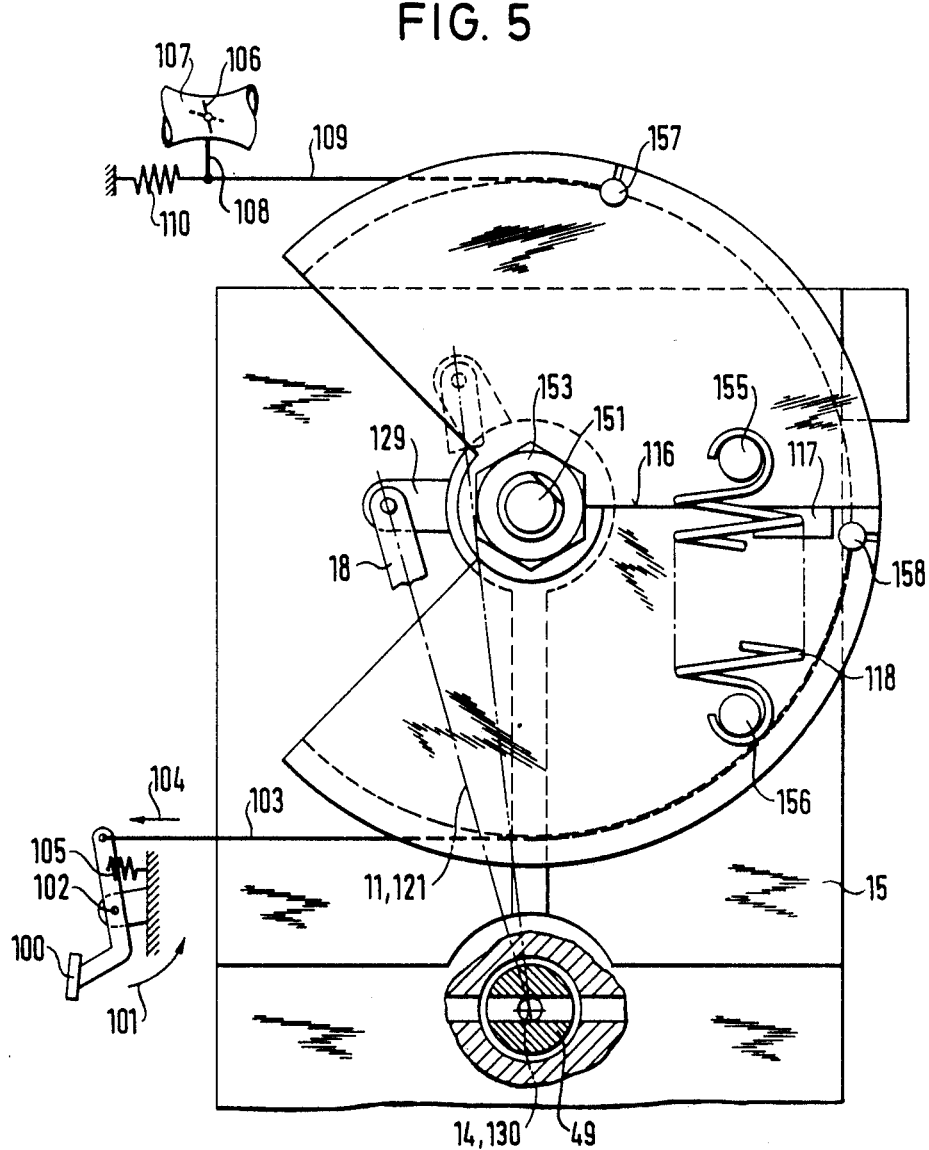
FIG. 5 is a view of the crank mechanism in the direction marked V in FIG. 4.

Referring now to FIGS. 4 and 5, a shaft 151 is provided at the main body 15, the axial direction of the shaft 151 being parallel to that of the combined swing-guide pivot 49. Rigidly connected with the shaft 151 is the radially projecting crank arm 129. The crank arm 129 forms a joint socket with which the joint head 150 engages. By means of this crank-joint connection, the shaft 151 is turned as the piston rod 18 moves in and out, with the hydraulic control element 11 simultaneously pivoting around the combined swing-guide pivot 49.

To the other side of the main body 15, the two sector disks 111, 114 are arranged on the shaft 151 with stepped diameter. The second sector disk 114 which comes to lie closer to the main body 15 is swivellingly arranged on the shaft 151 by means of a bearing 152. The first sector disk 111, however, is fixedly connected with the shaft 151. Both sector disks are secured by a nut 153 which is screwed onto a projecting end of the shaft 151 designed as threaded journal.

The peripheral surfaces of the sector disks 111, 114 are provided with grooves 154, in which the cable of the associated cable transmission is received. Furthermore, the sector disks 111, 114 each carry an axially projecting pin 155, 156. Between the two ends of those pins 155, 156, the spring 118 is stretched.

FIG. 5 shows another diagrammatic view of the crank mechanism whose push rod is formed by the hydraulic control element 11 swivellingly arranged around the swing-guide pivot 49, and whose crank member is formed by the shaft 151 with the crank arm 129 and the first sector disk 111. Two angular positions of the crank joint are shown and the path travelled between them by the piston rod moving outward. The sector disks 111, 114 are shown in the position they take in normal driving operation in which they are in contact with each other along the contact radius 116. This position is defined by a stop 117 provided on the second sector disk 114 close to the contact radius 116. Particular attention should be given to the position of the pins 155, 156, which are the anchoring points of the spring element 118. The pin 155 carried by the sector disk 111 is located close to the contact radius 116 slightly beyond the radial center of the sector disk 111. The pin 156, however, is arranged in the peripheral area of the second sector disk 114 in such a way that the spring 118, in the contact position it takes in normal driving operation, extends transverse to the contact radius 116. Finally, FIG. 5 shows the fastening points 157, 158 for the transmission ropes engaging at the sector disks 111, 114. The fastening point for the rope 109 leading to the throttle valve linkage is located approximately in the peripheral center of the first sector disk 111. The fastening point 158 for the rope 103 connected with the accelerator pedal 100, however, is located close to the contact radius of the second sector disk next to the stop 117.

What is claimed is:

1. Traction slip control device, comprising a sensor for sensing a beginning slip action at at least one driving wheel, a control circuit connected to the sensor and to an auxiliary drive, said auxiliary drive actuates throttle valve of a drive engine in a closing manner when the sensor feeds a slip signal to the control circuit, the auxiliary drive including a pressure-fluid-operated working cylinder and a push rod connected to a crank member, said crank member connected to the throttle valve, and connected by way of a spring element with an accelerator-pedal-actuated member, said working cylinder adapted to overcome the force of said spring element, wherein the accelerator-pedal-actuated member of the crank member comprises a first sector disk around which a first transmission cable extends said first cable connected to a throttle valve linkage, and wherein the crank member further comprises a second sector disk arranged on a common crank axle with the first sector disk, said second disk rotatable relative to said first disk, a second transmission cable around said second sector disk connected to the accelerator pedal, said spring element is a tension spring extending substantially transverse to a contact radius between both of the sector disks.

2. Traction slip control device as defined in claim 1, wherein the working cylinder is arranged swivellingly on an axis lying parallel to the crank axle.

3. Traction slip control device, comprising a sensor for sensing a beginning slip action at at least one driving wheel, a control circuit connected to the sensor and to an auxiliary drive, said auxiliary drive actuates throttle valve of a drive engine in a closing manner when the sensor feeds a slip signal to the control circuit, the auxiliary drive including a pressure-fluid-operated working cylinder and a push rod connected to a crank member, said crank member connected to the throttle valve, and connected by way of a spring element with an accelerator-pedal-actuated member, said working cylinder adapted to overcome the force of said spring element, wherein the push rod is connected via an axial locking mechanism with a piston of the working cylinder.

4. Traction slip control device as defined in claim 3, wherein the axial locking mechanism is adapted to fix said piston to the piston rod in response to pressure-fluid operation in order to obtain a displacement force operating in a closing direction of the throttle valve, said axial locking mechanism adapted to release the piston rod from the piston for movement in a closing direction of the throttle valve.

5. Traction slip control device as defined in claim 4, wherein the working cylinder includes a spring-return means in the form of a readjustment spring.

6. Traction slip control device as defined in claim 5, wherein the working cylinder comprises a stepped cylinder, a stepped piston slidingly displaced therein, said stepped piston includes an axial bore the piston rod in said axial bore.

7. The device as defined in claim 6, wherein an annular pressure chamber is arranged between the stepped piston and the stepped cylinder, said pressure chamber connected via an opening valve to a pressure source and via a closing valve to a supply reservoir, said opening valve and said closing valve electrically connected to and actuated by electromagnets, said electromagnets connected to and controlled by the control circuit.

8. The device as defined in claim 7, wherein the axial locking mechanism comprises a sleeve slidingly arranged in the axial bore of the stepped piston and being fixed to the stepped cylinder, said sleeve having a cone-type taper provided at a front side, a plurality of balls at the front side arranged around the piston rod, said balls being pressed in a rest position of the stepped piston against said taper by an auxiliary spring supported on the stepped piston during movement of the stepped piston to the rest position and against a cone-type enlargement at the circumference of the axial bore.

9. The device as defined in claim 8, wherein the piston rod emerges from a bore in a front wall of the working cylinder, said front wall located at an end of the working cylinder at a free end of the smaller-diameter portion of the stepped piston, therein said crank member connected to the throttle valve at said end.

10. The device as defined in claim 9, wherein the sleeve comprises a ring flange abutting the front wall.

11. The device as defined in claim 10, wherein an end of the working cylinder opposite the end thereof whereat the piston rod emerges includes a protective cap axially fixedly which the readjusting spring is supported.

12. The device as defined in claim 11, wherein the protective cap comprises a guide sleeve extending axially into the stepped cylinder and a guiding extension portion of the piston rod is slidingly guided in the guide sleeve.

13. The device as defined in claim 12, wherein a spring support in the form of an annular cap is provided in the stepped piston, said spring support slidingly surrounds the piston rod and includes a guide portion surrounded by one end of the readjusting spring.

14. The device as defined in claim 13, wherein the auxiliary spring is supported on one side thereof at the spring support and on an opposite side thereof at a supporting ring, said supporting ring axially slidingly guided on the piston rod, said spring support including a radially enlarged portion, said supporting ring disposed inside the enlarged portion and is in contact with the balls of said locking mechanism.

15. The device as defined in claim 14, further including a combined swing-guide pivot including an axial bore arranged on a transverse axis, said bore closed at a first side and opening into the pressure chamber at a second side, said axial bore connected by a branching hydraulic conduit to the opening valve and to the closing valve.

16. The device as defined in claim 15, wherein the swing-guide pivot is swingingly and sealedly supported with gaskets in a guide bore running concentrically with the transverse axis, the swing-guide pivot comprises a small-diameter portion that includes at least one branch channel extending from the axial bore to an outer surface of the swing-guide pivot, and two hydraulic conduits are provided in a main body of the device which connect the opening valve and the closing valve, respectively, to the annular cylinder chamber formed by the small-diameter portion of said swing guide pivot and said guide bore.

17. The device as defined in claim 16, wherein said hydraulic conduits branch off at diametrically opposed sides from the annular cylinder chamber, one conduit leading to the opening valve, the other leading to the closing valve.

18. The device as defined in claim 17, wherein the swing-guide pivot emerges from the main body at a location facing away from the working cylinder is provided with an external thread, a nut is screwed onto said external thread, said nut engaging a washer against a front wall of the main body, from which the end-portion of the swing-guide pivot emerges.

19. The device as defined in claim 18, wherein the stepped cylinder comprises an annular bearing surface around the swing-guide pivot, said bearing surface slightly projects axially from a surface of the stepped cylinder in the direction of said pivot said bearing surface is in sliding contact with a supporting surface adjacent to the stepped cylinder.

20. The device as defined in claim 19, wherein the piston rod comprises an end portion provided with an external thread said thread screwed into a matching internal thread in an adjoining joint sleeve to a position defining a predetermined basic setting of the device.

* * * * *